United States Patent Office 3,519,640
Patented July 7, 1970

3,519,640
4-SUBSTITUTED-1,2-DIPHENYL-3,5-DIOXO-PYRAZOLIDINES
Václav Musil, Bohumila Brunová, Oldřich Němeček, and Jitka Muratová, Prague, Czechoslovakia, assignors to Spofa, United Pharmaceutical Works, Prague, Czechoslovakia
No Drawing. Filed Dec. 21, 1966, Ser. No. 603,425
Claims priority, application Czechoslovakia,
Dec. 23, 1965, 7,748/65
Int. Cl. C07d 49/08
U.S. Cl. 260—310                               20 Claims

ABSTRACT OF THE DISCLOSURE

Novel 1,2-diphenyl-3,5-dioxo-pyrazolidines substituted in the 4-position by one or two substituted 3-oxo-alkyl groups having anti-inflammatory, analgesic anti-rheumatic, fibrinolytic and uricosurial properties and methods for the production of such pyrazolidines, including the alkylation of 1,2-diphenyl-3,5-dioxo-pyrazolidines with quaternary compounds of Mannich bases.

---

The present invention relates to new pyrazolidines having anti-inflammatory, analgesic, anti-rheumatic, fibrinolytic, and uricosurial activity. More particularly, the present invention relates to new 4-substituted-1,2-diphenyl-3,5-dioxo-pyrazolidines possessing anti-inflammatory activity, methods on the preparation thereof, and also the methods of compounding and using the same.

Generally, drugs having antiphlogistic activity are classified in accordance with their anti-rheumatic and/or anti-thrombolic effectiveness; anti-phlogistic medicaments, particularly derivatives of diphenyl-dioxo-pyrazolidines, are very important and valuable compounds because of their broad pharmacodynamic spectrum, which includes anti-phlogistic, analgesic, anti-pyretic, as well as uricosuric activities. The use of this class of compounds on the therapy of phlebitis and thrombosis has proved the efficacy of diphenyl-dioxo-pyrazolidines as anti-thrombotic and fibrinolytic agents. For the matter of convenience, the above-mentioned various pharmacodynamic properties of the new diphenyl-dioxo-pyrazolidines of the invention will be referred to hereinafter as anti-phlogistic properties.

It is an object of the present invention to provide new derivatives of diphenyl-dioxo-pyrazolidines having marked anti-phlogistic activity and good compatibility.

It is another object of the present invention to provide new derivatives of diphenyl-dioxo-pyrazolidines characterized by their therapeutic efficacy, i.e., marked anti-phlogistic activity and substantially no incidence of undesired side effects.

It is still another object of the present invention to provide pharmaceutical preparations having anti-inflammatory, analgetic, anti-pyretic, fibrinolytic, anti-rheumatic, and uricosuric activity. It is a further object of the present invention to provide a method for the therapy of diseases where generally an anti-phlogistic preparation is indicated.

It is a further object of the present invention to provide a simple and economically feasible process for the manufacture of the new derivatives of diphenyl-dioxo-pyrazolidines.

The new anti-phlogistic agent according to the present invention can be identified as 4-substituted-1,2-diphenyl-3,5-dioxo-pyrazolidines of the formula

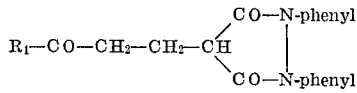

Generally, $R_1$ is a straight or branched chain alkyl, phenyl which substituted by one or more halogen atoms, one or more alkyl-, alkylmercapto-, trifluormethyl-, carboxy- or benzyloxy groups, indanyl-, tetrahydronaphthyl adamantyl-, or a heterocyclic group, whereby all groups may be substituted by the aforementioned phenyl substituents. More specifically, $R_1$ can be:

(1) Lower alkyl having from 1–6 carbon atoms, such as methyl, ethyl, propyl, n-butyl, tert,-butyl, n-pentyl, iso-pentyl, tert.-pentyl, hexyl, and the like;

(2) Substituted phenyl such as halo-phenyl as, for instance, 2-fluorophenyl, 3-fluorophenyl, 4-fluorophenyl, 2-iodophenyl, 4-iodophenyl, 2-chlorophenyl, 3-chlorophenyl, 2-bromophenyl, 2,4-dichlorophenyl; 2,4-difluorophenyl, alkyl substituted phenyls, preferably lower alkyl substituted phenyl such as 5-methylphenyl; 4-methylphenyl; 2,5-dimethyl phenyl; 3,4-dimethylphenyl; 2,4,6-trimethylphenyl; 4-ethylphenyl; 4-isopropylphenyl; 4-n-butylphenyl; 4-isobutylphenyl; 4-tert.butylphenyl; 3- and 4-isopentylphenyl; in addition to the mono-, di- and tri- lower alkyl substituted phenyls, wherein the alkyl substituents preferably have from 1 to 6 carbon atoms and wherein the alkyl substituents may be substituted by halogen, such as fluorine, chlorine, bromine or iodine; e.g., 4-dichloromethylphenyl; 5 - monochloromethylphenyl, trifluoromethylphenyl; halo-alkyl substituted phenyls, such as 2-chloro - 5 - methylphenyl; 3-bromo-4-methylphenyl; 3-chloro - 4,6-dimethylphenyl; 2-chloro-5-ethyl-phenyl and the like; alkylmercaptophenyls such as 4-methylthiophenyl; p - tolylmercaptan; ethylphenylmercaptan; n-propylmercaptan, tert.butylphenylmercaptan; and the like; carboxy-substituted phenyl includes phenyl substituted with straight as well with branched carboalkoxy groups, preferably with lower carboalkoxy groups, such as $C_1$–$C_6$ lower alkoxy chains, for instance, methoxy to hexyloxy, benzyloxyphenyl;

(3) Indane, which may be substituted by the aforementioned substituents for phenyl, such as 5-indanoyl ethyl;

(4) Tetrahydronaphthalene, which may be substituted with any of the above-mentioned substituents for the phenyl, such as: 6-tetrahydronaphthoyl-ethyl;

(5) Adamantane, which may be substituted with any of the above-mentioned substituents for phenyl;

(6) Heterocyclic groups including substituted and unsubstituted as well as saturated and unsaturated carbon rings containing as nuclear members thereof one or more hetero atoms such as oxygen, nitrogen or sulfur. As substituents which may be attached to the heterocyclic ring, those enumerated above as substituents for phenyl are suitable. The following are illustrative of heterocyclic radicals: morpholino, thiomorpholino, pyridino, piperidino, pyrrolidino, etc.

The new 4-substituted 1,2-diphenyl-3,5-dioxo-pyrazolidines according to Formula I may be used as such or in the form of their salt with inorganic or organic bases, which have no undesirable side reactions.

According to the invention the compounds of the Formula I are prepared by alkylating 1,2-diphenyl-3,5-dioxo-pyrazolidine by means of a compound of the Formula II $$R_1—CO—CH_2—CH_2—N(R_4R_5R_6)Y \qquad (II)$$

wherein $R_1$ has the same meaning as given in the Formula I, $R_4$ and $R_5$ each stands for alkyl, and can be joined together with the nitrogen atom to form a heterocyclic ring, $R_6$ stands for alkyl, aralkyl, and Y stands for an acid anion.

The alkylation of 1,2-diphenyl-3,5-dioxo pyrazolidine is carried out preferably in the presence of anhydrous organic solvents, in the presence of inorganic or organic basically reacting agents, and preferably in the presence of an anhydrous alcohol having 1–5 carbon atoms, in the presence of an alkali metal alcoholate, i.e., in anhydrous methanol, in the presence of sodium methylate, at elevated temperature, especially at the temperature of the reaction mixture's boiling point.

Compounds of the Formula I can also be prepared by condensation of a substituted derivative of malonic acid of the Formula III $$R_1-CO-CH_2-CH_2-CH(COX)_2 \quad (III)$$

wherein the substituent R, has the same significance as in Formula I, and X stands for hydroxyl, alkoxyl or halogen, with hydrazobenzene, and in the case that X represents hydroxyl, in the presence of an anhydrous organic solvent, and in the presence of dicyclohexyl carboimide; in case that X in the Formula III designates an alkoxyl, said condensation is carried out by previously ensuring protection by ketalization of the keto group in the side chain, in the medium of anhydrous organic solvents, in the presence of alkali metal alcoholates or hydrides; and in the case that X in the Formula III designates a halogen, the condensation is carried out as well in the presence of anhydrous organic solvent, and in the additional presence of an agent for absorbing the hydrogen halide formed, e.g., pyridine. Besides the methods just cited, the compounds of the Formula I can also be obtained by alkylation of 1,2-diphenyl-3,5 - dioxo - pyrazolidine with beta-halogenoketones, or by the Michael addition of vinyl ketones.

The most advantageous method is, however, the method of the present invention, and, namely, alkylation of 1,2-diphenyl-3,5-dioxo-pyrazolidine by means of the quaternary compounds of Mannich bases of the Formula III. The Mannich bases and the quaternary compounds thereof can be prepared from a large number of ketones having a reactive hydrogen atom in the vicinity of the keto groups, as, for instance, by the reaction with formaldehyde and a secondary amine or a salt thereof. For the quaternization of the Mannich bases thereby obtained there can be used alkyl-p-toluenesulfonates, alkyl sulfates, or alkyl halides, as, for example, methyl iodide, benzyl chloride, or dimethyl sulfate.

The reaction between the Mannich base quaternary salts and 1,2-diphenyl-3,5-dioxo pyrazolidine or salts thereof, takes such a course that beside the mono-substituted derivatives of the Formula I also a certain portion of di-substituted derivatives of the Formula IV are formed:

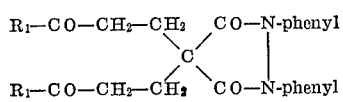

wherein the substituent $R_1$ has the same significance as in Formula I. The ratio between the mono- and di-substituted derivatives can be influenced by the reaction conditions, above all by the choice of the quaternization agent, the mixing rate of the reaction components, temperature, reaction time, and the ratio of the reaction components. The mono-substituted derivatives of the Formula I form with alkali metal hydroxides water-soluble salts, which property can be utilized for separating them from the di-substituted derivatives. The reaction mixture usually contains also a little quantity of the unreacted 1,2-diphenyl-3,5-dioxo-pyrazolidine that can be separated by crystallization from a suitable solvent.

The following examples are given to illustrate the invention and are not to be construed as a limitation thereof:

EXAMPLE 1

1,2-diphenyl-3,5-dioxo-4-(4,4-dimethyl-3-oxopentyl)-pyrazolidine

A solution of 126 g. 1,2-diphenyl-3,5-dioxo-pyrazolidine in a sodium methylate solution prepared by dissolving 12.5 g. sodium in 750 ml. absolute methanol was added to a solution of 78.5 g. 1-dimethylamino-4,4-dimethyl-3-pentanone in 200 ml. absolute methanol. The mixture was heated to the boil with stirring, and a solution of 62.8 g. dimethyl sulfate in 150 ml. methanol added dropwise in the course of 40–50 min. After having boiled the mixture for 3 hours with stirring, it was concentrated to ⅓ of the original volume, and poured into 2000 ml. of boiling water. After cooling the mixture to room temperature the undissolved portion was separated with suction, and the filtrate after being decolorized with charcoal was acidified with dilute hydrochloric acid. The product thus eliminated was separated and recrystallized from ethanol. The yield was 70 g. M.P. 139–140° C. (dilute acetic acid).

EXAMPLE 2

1,2-diphenyl-3,5-dioxo-4-[3-(2-fluorophenyl)-3-oxopropyl]-pyrazolidine

The base was liberated by addition of a solution of 1.75 g. sodium in 110 ml. absolute methanol to a suspension of 18.0 g. 2-fluoro-β-dimethylaminopropiophenone hydrochloride in 150 ml. absolute methanol. To the solution thus obtained a solution of the sodium salt of 1,2-diphenyl-3,5-dioxo-pyrazolidine was added which had been prepared by dissolving 17.7 g. of 1,2-diphenyl-3,5-dioxo-pyrazolidine in a solution of 1.75 g. sodium in 110 ml. absolute methanol. The reaction mixture was heated to the boil, whereupon a solution of 10.0 g. methyl iodide in 75 ml. methanol was added dropwise in the course of 20 min., and the mixture boiled for a further 4 hours. After concentration to a small volume the reaction mixture was poured into 500 ml. of water having 90° C. temperature. It was filtered with decolorizing charcoal, and the filtrate after being cooled was acidified with dilute hydrochloric acid. The product separated out was recovered and recrystallized from ethanol. M.P. 175–177° C.

Using the above-described reaction procedure, the following substances were analogously prepared:

(a) 1,2-diphenyl-3,5-dioxo-4-[3-(3'-fluorophenyl)-3-oxopropyl]-pyrazolidine, M.P. 149–150° C.;
(b) 1,2-diphenyl-3,5-dioxo-4-[3-(4'-fluorophenyl)-3-oxopropyl]-pyrazolidine, M.P. 106–107° C.;
(c) 1,2-diphenyl-3,5-dioxo-4-[3-(2'-iodophenyl)-3-oxopropyl]-pyrazolidine, M.P. 135–137° C.;
(d) 1,2-diphenyl-3,5-dioxo-4-[3-(3'-iodophenyl)-3-oxopropyl]-pyrazolidine, M.P. 114–115° C.;
(e) 1,2-dphenyl-3,5-dioxo-4-[3-(4'-iodophenyl)-3-oxopropyl]-pyrazolidine, M.P. 151–152° C.;
(f) 1,2-diphenyl-3,5-dioxo-4-[3-(2'-chlorophenyl)-3-oxopropyl]-pyrazolidine, M.P. 125–127° C.;
(g) 1,2-diphenyl-3,5-dioxo-4-[3-(3'-chlorophenyl)-3-oxopropyl]-pyrazolidine, M.P. 119–120° C.;
(h) 1,2-diphenyl-3,5-dioxo-4-[3-(2'-bromophenyl)-3-oxopropyl]-pyrazolidine, M.P. 138–139° C.;
(i) 1,2-diphenyl-3,5-dioxo-4-[3-(3'-bromophenyl)-3-oxopropyl]-pyrazolidine, M.P. 119–121° C.;

EXAMPLE 3

1,2-diphenyl-3,5-dioxo-4-[3-(3'-trifluoromethylphenyl)-3-oxopropyl]-pyrazolidine To a suspension of 15.5 g. 3-trifluoromethyl-β-dimethylaminopropiophenone hydrochloride in 150 ml. methanol, a solution of 1.25 g. sodium in 30 ml. methanol was added in dropwise fashion with stirring. After about 10 minutes a solution of the sodium salt of 1,2-diphenyl-3,5-dioxo-pyrazolidine was added which had been prepared by dissolving 12.6 g. of 1,2-diphenyl-3,5-dioxo-pyrazolidine in a solution of 1.25 g. sodium in 75 ml. methanol. The reaction mixture was heated to the boil, whereupon a solution of 6.3 g. dimethyl sulfate in 50 ml. methanol was added dropwise with stirring in the course of 15 minutes. It was stirred for further 5 hours and the major part of methanol was distilled off, and the residue poured into 500 ml. boiling water. The mixture was cooled to room temperature, the undissolved portion filtered off, and the filtrate acidified with dilute hydrochloric acid. The product was separated with suction and recrystallized from ethanol. The yield was 5.0 g. M.P. 128–130° C.

EXAMPLE 4

1,2-diphenyl-3,5-dioxo-4-[3-(2'-chloro-5'-methylphenyl)-3-oxopropyl]-pyrazolidine

From a suspension of 14.4 g. 2-chloro-5-methyl-β-dimethyl-aminopropiophenone hydrochloride in 100 ml. methanol, the base was liberated by the equimolecular quantity of sodium methylate in 75 ml. methanol. To the solution thus obtained a solution of 12.6 g. of 1,2-diphenyl-3,5-dioxopyrazolidine in a sodium methylate solution was added, which had been prepared by dissolving 1.25 g. sodium in 75 ml. methanol. The reaction mixture was heated to the boil, and during 15 minutes a solution of 6.3 g. dimethyl sulfate in 50 ml. methanol was added dropwise. The mixture was boiled for a further 3 hours, concentrated to ⅓ of the original volume, and the residue poured into 500 ml. boiling water. After cooling down, the undissolved portion was filtered off, and the product precipitated out of the filtrate by acidifying the latter with hydrochloric acid. The precipitate was recovered and recrystallized from ethanol. The yield was 13 g., B.P. 118–120° C.

Analogously there were prepared:

(a) 1,2-diphenyl-3,5-dioxo-4-[3-(3'-bromo-4'-methylphenyl)-oxopropyl]-pyrazolidine, M.P. 146–148° C.;
(b) 1,2-diphenyl-3,5-dioxo-4-[3-(4'-methylthiophenyl)-3-oxopropyl]-pyrazolidine, M.P. 126–127° C.;
(c) 1,2-diphenyl-3,5-dioxo-4-[3-(2',5'-dimethylphenyl)-3-oxopropyl]-pyrazolidine M.P. 129–130° C.;
(d) 1,2-diphenyl-3,5-dioxo-4-[3-(3',4'-dimethylphenyl)-3-oxopropyl]-pyrazolidine, M.P. 147–148° C.;
(e) 1,2-diphenyl-3,5-dioxo-4-[3-(2',4',6'-trimethylphenyl)-3-oxopropyl]-pyrazolidine, M.P. 123–125° C.;
(f) 1,2-diphenyl-3,5-dioxo-4-[3-(4'-ethylphenyl)-3-oxopropyl]-pyrazolidine, M.P. 130–132° C.;
(g) 1,2-diphenyl-3,5-dioxo-4-[3-(4'-isopropylphenyl)-3-oxopropyl]-pyrazolidine, M.P. 122–123° C.;
(h) 1,2-diphenyl-3,5-dioxo-4-[3-(4'-isobutylphenyl)-3-oxopropyl]-pyrazolidine M.P. 122–124° C.;
(i) 1,2-diphenyl-3,5-dioxo-4-[3-(4'-isobutylphenyl)-3-oxopropyl]-pyrazolidine, M.P. 136–137° C.;
(j) 1,2-diphenyl-3,5-dioxo-4-[3-(4'-sec.butylphenyl)-3-oxopropyl]-pyrazolidine, M.P. 115–116° C.;
(k) 1,2-diphenyl-3,5-dioxo-4-[3-(4'-tert.butylphenyl)-3-oxopropyl]-pyrazolidine, M.P. 125–126° C.;
(l) 1,2-diphenyl-3,5-dioxo-4-[3-(5-indanoylethyl)-pyrazolidine, M.P. 134–136° C.;
(m) 1,2-diphenyl-3,5-dioxo-4-(6-tetrahydronaphthoylethyl)-pyrazolidine, M.P. 129–131° C.;
(n) 1,2-diphenyl-3,5-dioxo-4-(1-naphthoylethyl)-pyrazolidine, M.P. 162–164° C.;
(o) 1,2-diphenyl-3,5-dioxo-4-[3-(4'-carboxyphenyl)-3-oxopropyl]-pyrazolidine M.P. 195–196° C.;
(p) 1,2-diphenyl-3,5-dioxo-4-[3-(4'-benzyloxyphenyl)-3-oxopropyl]-pyrazolidine, M.P. 130–131° C.;
(q) 1,2-diphenyl-3,5-dioxo-4-[3-(2'-adamantyl)-3-oxopropyl]-pyrazolidine, M.P. 152–153° C.;
(r) 1,2-diphenyl-3,5-dioxo-4-[3-(2'-thienyl)-3-oxopropyl]-pyrazolidine, M.P. 148–149° C.;
(s) 1,2-diphenyl-3,5-dioxo-4-(4-methyl-3-oxobutyl)-pyrazolidine, M.P. 116–118° C.;
(t) 1,2-diphenyl-3,5-dioxo-4-(4-methyl-3-oxohexyl)-pyrazolidine, M.P. 101–103° C.

The activity of the 4-substituted 1,2-diphenyl-3,5-dioxo-pyrazolidines was tested according to the method of Kaulla J. Med. Chem. 8, 164 (1965), a method which permits the fibrinolytic activity of synthetic compounds to be evaluated. This procedure constituting an in vitro test consists essentially of the formation of clots from recalcified citrated human plasma and the incubation of the clots in media containing the compound to be tested in a series of graded concentrations. The fibrinolysis capacity is expressed by the concentration of the compound tested at which a complete lysis at a given time occurs. More specifically, the tests were carried out as follows:

The technical arrangement of the experiment was identical with that described by von Kaulla in which human plasma clots were incubated at 37° C. in buffered solutions of the compounds to be tested. The fibrinolysis-inducing effect was apparent by a partial to complete dissolution of the clots suspended on glass rods in the incubation medium.

The compounds presented in Table I were of analytical grade. Weighted samples of several compounds, insoluble in the barbital acetate buffer solution, were first dissolved in 0.5–1 ml. of dimethylacetamide, acetone, or ethanol, and the volume was made up to 10 ml. with the buffer solution, the pH being immediately adjusted to 7.42. Parallel experiments with phenylbutazone (1,2-diphenyl-3,5-dioxo-4-n-butylpyrazolidine) and ketophenylbutazone proved that the solvents used did not interfere with the testing of the fibrinolysis. Each of the two compounds was dissolved at the same concentration either with the solvents added or in the buffer solution alone. Identical results were obtained proving that the solvents named above, when used in the amounts mentioned before, were inert and did not influence the testing of fibrinolytic activity.

The results were read after 24 hrs. In some cases, where after 24 hrs. a distinct lytic effect could be observed but the clot had not dissolved completely, the incubation was prolonged for another 24 hrs. In such cases the fibrinolysis progressed. Both time intervals are indicated in Table I. In four cases even the 48-hr. incubation was not sufficient for a complete dissolution of the plasma clots although after 24 hrs. a partial lytic effect was well apparent. In these exceptional cases a subsequent pharmacological test in animals proved that the anti-inflammatory activity of the compounds in question was either very low or nonexistent.

The evaluation of results is presented in Table I, which comprises compounds possessing fibrinolysis-inducing capacity.

TABLE I.—RESULTS OF THE SCREENING EVALUATION OF FIBRINOLYTIC ACTIVITIES OF ANTI-INFLAMMATORY COMPOUNDS [a]

| No. | Compound [b] | Incubation, hours | 0.1 | 0.09 | 0.08 | 0.07 | 0.06 | 0.05 | 0.04 | 0.03 | 0.02 | 0.01 | 0.009 | 0.008 | 0.007 | 0.006 | 0.005 | 0.004 | 0.003 | 0.002 | 0.001 |
|---|---|---|---|---|---|---|---|---|---|---|---|---|---|---|---|---|---|---|---|---|---|
| 1 | $(CH_3)COCH_2CH_2X$ | 24 | | | | | | | | | | | | | | | | | | | |
|   |   | 48 | | | | | | | | | | | | | | | | | | | |
| 2 | $C_6H_5COCH_2CH_2X$ (benzopyrazone) | 24 | | | | | | | | | | | (+) | (+) | (+) | + | | | | | |
|   |   | 48 | | | | | | | | | | (+) | (+) | (+) | (+) | (+) | (+) | (+) | | | |
| 3 | $o\text{-}OCH_6H_4COCH_2CH_2X$ | 24 | | | | | | | | | | | | (+) | (+) | + | | | | | |
|   |   | 48 | | | | | | | | | | (+) | (+) | +++ | + | + | + | (+) | | | |
| 4 | $(CH_3)_2CHCH_2COCH_2CH_2X$ | 24 | | | | | | | | | | (+) | (+) | (+) | | + | | | | | |
|   |   | 48 | | | | | | | | | | + | (+) | + | + | (+) | | (+) | | | |
| 5 | $CH_3(CH_2)_3X$ (phenylbutazone) | | | | | | | | | | | + | | | | | | | (+) | + | |

TABLE I—Continued

| No. | Compound [b] | Incubation, hours | \multicolumn{12}{c}{Concentration, moles} |
|---|---|---|---|---|---|---|---|---|---|---|---|---|---|---|
| | | | 0.1 | 0.09 | 0.08 | 0.07 | 0.06 | 0.05 | 0.04 | 0.03 | 0.02 | 0.01 | 0.069 | 0.008 | 0.007 | 0.006 | 0.005 | 0.004 | 0.003 | 0.002 | 0.001 |
| 6 | (cyclohexanone-CH$_2$X) | 24 | | | | | | | | | + | | | | | | | | | | |
| | | 48 | | | | | | | (+) | (+) | + | (+) | | | | | | | | | |
| 7 | CH$_3$SCH$_2$CH$_2$X | 24 | | | | | | | | | | | | | | | | | | | |
| | | 48 | | | | | | | | (+) | | | | | | | | | | | |
| 8 | CH$_3$COCH$_2$CH$_2$X (ketophylbutazone) | 24 | | | | | | | (+) | + | (+) | | | | | | | | | | |
| | | 48 | | | | | | | +++ | + | + | | | | | | | | | | |
| 9 | (indomethacin structure CH$_3$O-...-CH$_2$COOH) | 24 | | | | | ++ | ++ | | (+) | | | | | | | | | | | |
| | | 48 | | | | ++ | ++ | | (+) | | (+) | | + | + | ++ | (+) | | | | | |
| 10 | p-IC$_6$H$_4$COOH | 24 | (+) | (+) | + | + | + | + | + | | | | | | | | | | | | |
| 11 | 2-OH-5-CH$_3$COC$_6$H$_3$COOH | 24 | + | + | (+) | (+) | | | | | | | | | | | | | | | |
| 12 | p-ClC$_6$H$_4$COOH | 24 | + | | | | | | | | | | | | | | | | | | |
| 13 | 3,5-I$_2$-4-NH$_2$C$_6$H$_2$SO$_3$H | 24 | + | | | | | | | | | | | | | | | | | | |
| | | 48 | | | | | | | | | | | | | | | | | | | |
| 14 | (naphthalene-COCH$_2$CH$_2$X) | 24 | | | | | | | | | | | | | | | | | | | |
| | | 48 | | | | | | | | | | | | | | (+) | (+) | | | | |
| 15 | (indane-COCH$_2$CH$_2$X) | 24 | | | | | (+) | (±) | (±) | | | | | | | | | | | | |
| | | 48 | | | | | (±) | (±) | (±) | | | | | | | | | | | | |
| 16 | o-FC$_6$H$_4$COCH$_2$CH$_2$X | 24 | | | | | | | | | | | | | | | (+) | (+) | | | |
| | | 48 | | | | | | | | | | | | | | | (+) | (+) | (±) | | |
| 17 | (cyclohexanone-CH$_2$CH(CO—NH-C$_6$H$_5$)(CO—N(C$_6$H$_5$)-)) | 24 | | | | | | | | | | | | | | | | | | | |
| | | 48 | | | | | | | | | | | | | | | | | | | |

[a] + = complete lysis of plasma clot; (+) = partial lysis of plasma clot.   [b] X = —HC(CONC$_6$H$_5$)(CONC$_6$H$_5$)

As a group, the diphenyl-dioxo-pyrazolidines reveal a direct relationship between their anti-inflammatory effectiveness and their fibrinolysis including capacity and furthermore the fibrinolytic activity is related to the anti-thrombolic effectiveness. The above described test permits a conclusion as to whether the new compounds have anti-phlogistic activity or not.

One of the aspects of the invention is to provide compositions which have anti-phlogistic activity for the treatment of diseases where anti-phlogistic pharmaceuticals are indicated. According to the invention, the novel pyrazolidine derivatives may be associated with a carrier, which may be either a solid material or a sterile parenteral liquid. As carrier, there can be used substances which do not react with the active substance and which are pharmacologically inert or are effective as adjuvants, such as, for example, water, gelatine, lactose, starches, colloidal silicic acid, magnesium stearate, talc, vegetable oils, benzoyl alcohols, gums, poly-alkaline glycols, or other known carriers. The pharmaceutical preparations can be, for example, in the form of tablets, degreés or in liquid form, as solutions, suspensions or emulsions. They may also be sterilized and/or contain auxiliary substances, such as preserving agent, stabilizing agent, wetting agents, emulsifying agents or buffers. They may also contain other therapeutically valuable substances. The percentage of the active compound in the composition may be varied. It is necessary that the active compound is present in such an amount that a suitable dosage will be obtained. Obviously, several unit dosage forms may be administered at about the same time.

What is claimed is as follows:

1. A compound selected from the group consisting of 4-substituted 1,3-diphenyl-3,5-dioxo-pyrazolidines of the formula:

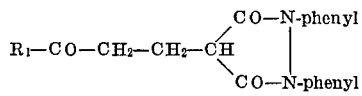

wherein $R_1$ is a member selected from the group consisting of alkyl of 3 to 6 carbon atoms, halo-lower alkyl substituted phenyl, alkyl substituted phenyl wherein alkyl is of 2 to 4 carbon atoms, methylmercapto substituted phenyl, carboxy substituted phenyl, benzyloxy substituted phenyl, trifluoromethyl substituted phenyl, thienyl, pyridyl, indanyl, tetrahydronaphthyl, adamantyl and a non-toxic pharmaceutically acceptable alkali salt of these compounds.

2. A compound according to claim 1 designated 1,2-diphenyl - 3,5-dioxo-4-(4,4-dimethyl-3-oxopentyl)-pyrazolidine.

3. A compound according to claim 1 designated 1,2-diphenyl - 3,5 - dioxo-4-[3-(3'-trifluoromethylphenyl)-3-oxopropyl]-pyrazolidine.

4. A compound according to claim 1 designated 1,2-diphenyl - 3,5-dioxo-4-[3-(4'-ethylphenyl)-3-oxopropyl]-pyrazolidine.

5. A compound according to claim 1 designated 1,2-diphenyl - 3,5-dioxo-4-[3-(4'-isopropylphenyl)-3-oxopropyl]-pyrazolidine.

6. A compound according to claim 1 designated 1,2-diphenyl - 3,5-dioxo-4-[3-(4'-butylphenyl)-3-oxopropyl]-pyrazolidine.

7. A compound according to claim 1 designated 1,2-diphenyl - 3,5 - dioxo-4-[3-(4'-isobutylphenyl)-3-oxopropyl]-pyrazolidine.

8. A compound according to claim 1 designated 1,2-diphenyl - 3,5 - dioxo - 4-[3-(4'-sec-butylphenyl)-oxopropyl]-pyrazolidine.

9. A compound according to claim 1 designated 1,2-diphenyl - 3,5-dioxo-4-[3-(4'-tert.butylphenyl)-3-oxopropyl]-pyrazolidine.

10. A compound according to claim 1 designated 1,2-diphenyl-3,5-dioxo-4-(5-indanoylethyl)-pyrazolidine.

11. A compound according to claim 1 designated 1,2-diphenyl - 3,5 - dioxo-4-(6-tetrahydronaphtoyl-ethyl)-pyrazolidine.

12. A compound according to claim 1 designated 1,2-diphenyl-3,5-dioxo-4-(1-naphtoylethyl)-pyrazolidine.

13. A compound according to claim 1 designated 1,2-diphenyl - 3,5 - dioxo-4-[3-(4'-carboxyphenyl)-3-oxopropyl]-pyrazolidine.

14. A compound according to claim 1 designated 1,2-diphenyl - 3,5 - dioxo-4-[3-(4'-benzyloxyphenyl)-3-oxopropyl]-pyrazolidine.

15. A compound according to claim 1 designated 1,2-diphenyl-3,5-dioxo-4-(4-methyl-3-oxohexyl)-pyrazolidine.

16. A compound according to claim 1 designated 1,2-diphenyl - 3,5 - dioxo-4-[3-(4'-methylthiophenyl)-3-oxopropyl]-pyrazolidine.

17. A compound according to claim 1 designated 1,2-diphenyl - 3,5-dioxo-4-[3-(2'-chloro-5'-methylphenyl)-3-oxopropyl]-pyrazolidine.

18. A compound according to claim 1 designated 1,2-diphenyl - 3,5-dioxo-4-[3-(3'-bromo-4'-methylphenyl)-3-oxopropyl]-pyrazolidine.

19. A compound according to claim 1 designated 1,2-diphenyl - 3,5 - dioxo-4-[3-(2'-adamantyl)-3-oxopropyl]-pyrazolidine.

20. 1,2 - diphenyl - 3,5 - dioxo-4-[3-(2',4',6'-trimethylphenyl)-3-oxopropyl]-pyrazolidine.

References Cited

Musil et al. Collection Czech. Chem. Commun. vol. 29, pp. 1669–74 (1964).

Roubal et al. Jour. Med. Chem. vol. 9, pp. 840–2 (1966, November 1966).

NATALIE TROUSOF, Primary Examiner

U.S. Cl. X.R.

260—243, 247.2, 247.5, 247.7, 294, 294.7, 295, 296, 297, 476, 483, 515, 468, 514, 544, 563, 570.5, 584; 424—246, 248, 263, 267, 273